O. Hyde     Imp't. in Traction Wheels.
No. 117174     Patented Jul 18 1871
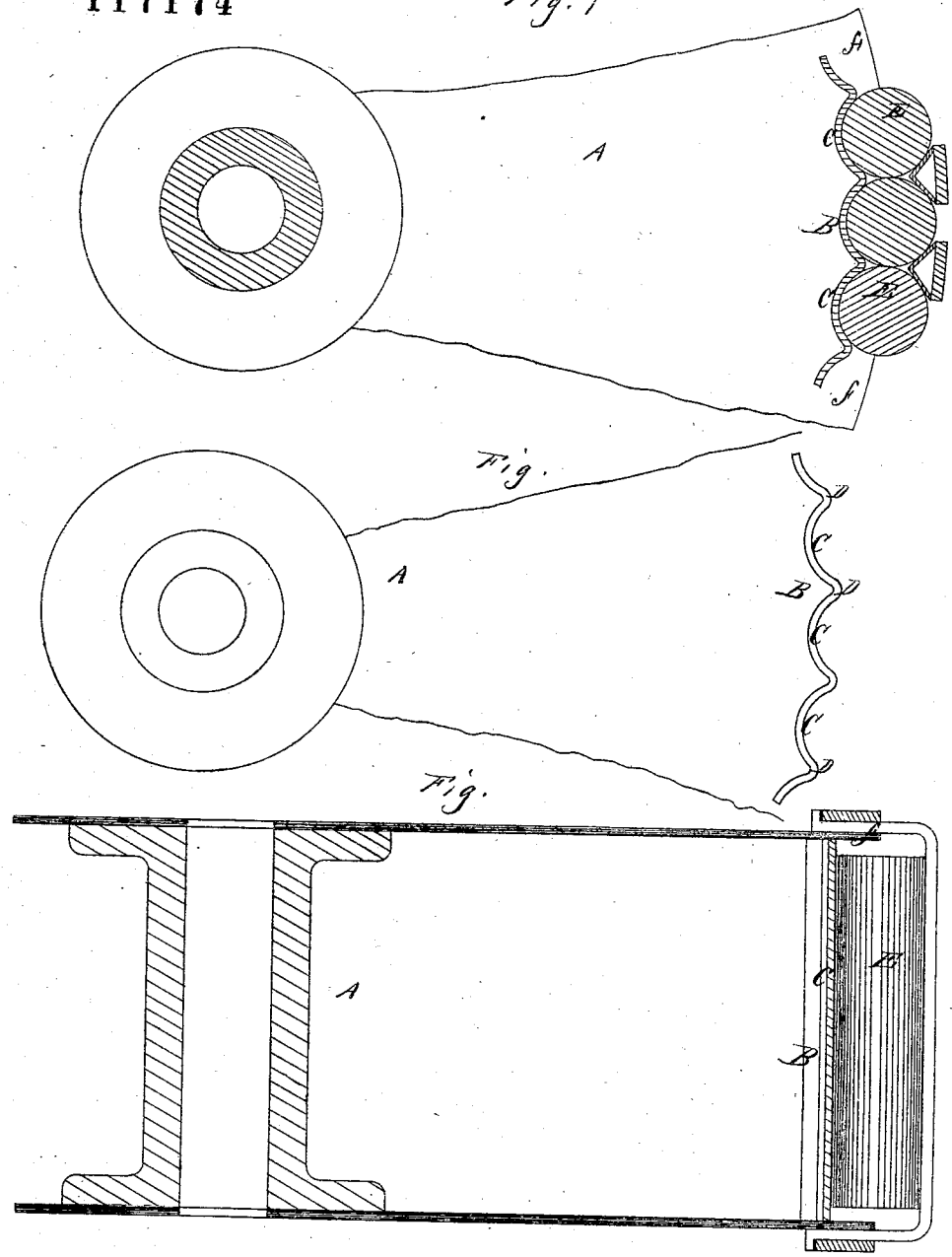

117,174

UNITED STATES PATENT OFFICE.

OLIVER HYDE, OF OAKLAND, CALIFORNIA.

IMPROVEMENT IN TRACTION-WHEELS.

Specification forming part of Letters Patent No. 117,174, dated July 18, 1871.

*To all whom it may concern:*

Be it known that I, OLIVER HYDE, of Oakland, county of Alameda, State of California, have invented Improvements in the Wheels of Traction-Engines; and I do hereby declare the following description and accompanying drawing are sufficient to enable any person skilled in the art or science to which it most nearly appertains to make and use my said invention or improvements without further invention or experiment.

My invention relates to improvements in traction-wheels; and it consists in casting or otherwise forming the metallic rim or tire of the wheel so that it shall present a corrugated face either for the purpose of taking direct hold upon the ground, or for receiving the elastic blocks when an elastic tire is desired.

In order to more fully illustrate and explain my invention, reference is had to the accompanying drawing forming a part of this specification, in which—

A represents a section of any traction-wheel. The tire or rim is cast or otherwise formed with alternate circular depressions or channels C, between each two of which is a spine or rib, D. These channels and ribs extend across the face of the wheel around its entire circumference, forming what I call a corrugated rim or tire. This form of tire will serve admirably for taking direct hold of the ground when used without any further tire, and when it it is desired to provide the wheel with an elastic tire it will only be necessary to place my cylindrical elastic blocks E, one in each of the channels or depressions, as shown, and bind them together by proper means. The channels will thus provide a suitable and convenient bed for the blocks E, from which they cannot become displaced.

When the wheel is constructed especially for the elastic tire the sides should be extended above the corrugated metallic rim so as to form side pieces *f*, as shown at Figs. 1 and 2.

Having thus described my invention, what I claim, and desire to secure by Letters Patent, is—

1. The tire B, when formed with alternate elevations and circular depression C D for traction purposes, substantially as above described.

2. The corrugated metallic tire B, in combination with the cylindrical elastic blocks E, substantially as and for the purpose above described.

In witness whereof I have hereto set my hand and seal.

OLIVER HYDE. [L. S.]

Witnesses:
  J. L. BOONE,
  WM. GERLACH.